United States Patent
Dennerlein

(10) Patent No.: US 9,042,624 B2
(45) Date of Patent: May 26, 2015

(54) METHOD FOR REDUCING MOTION ARTIFACTS

(71) Applicant: SIEMENS AKTIENGESELLSCHAFT, Munich (DE)

(72) Inventor: Frank Dennerlein, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 13/803,579

(22) Filed: Mar. 14, 2013

(65) Prior Publication Data

US 2013/0243293 A1    Sep. 19, 2013

(30) Foreign Application Priority Data

Mar. 14, 2012 (DE) .......................... 10 2012 204 019

(51) Int. Cl.
*G06K 9/00* (2006.01)
*G06T 11/00* (2006.01)

(52) U.S. Cl.
CPC ..................................... *G06T 11/008* (2013.01)

(58) Field of Classification Search
CPC ... G06T 11/003; G06T 11/008; G06T 11/005; G06T 2211/421
USPC ......................................................... 382/131
See application file for complete search history.

(56) References Cited

U.S. PATENT DOCUMENTS

| 8,233,586 B1 * | 7/2012 | Boas ................................. 378/4 |
| 8,666,137 B2 * | 3/2014 | Nielsen et al. ................ 382/131 |
| 2001/0028696 A1 * | 10/2001 | Yamada et al. ................... 378/4 |
| 2007/0121779 A1 * | 5/2007 | Nishide et al. .................... 378/4 |
| 2007/0280404 A1 * | 12/2007 | Nielsen et al. .................... 378/4 |

(Continued)

OTHER PUBLICATIONS

Kyriakou, et al.; "Image-based online correction of misalignment artifacts in cone-beam CT"; Medical Imaging 2009: Physics of Medical Imaging. Edited by Samei, Ehsan; Hsieh, Jiang. Proceedings of the SPIE, vol. 7258, pp. 72581V-72581V-10 (2009).; 2009; Erlangen, Germany.

(Continued)

*Primary Examiner* — Utpal Shah
(74) *Attorney, Agent, or Firm* — Laurence A. Greenberg; Werner H. Stemer; Ralph E. Locher

(57) ABSTRACT

Artifacts result from unrecorded, stochastically distributed relative movements of a radiation source, radiation detector, and/or the object during a scanning process. The artifacts occur when a three-dimensional image dataset is reconstructed from two-dimensional projection images acquired from different projection directions. Geometric parameters describing an acquisition geometry for each projection image are taken into account during the reconstruction. The correction includes filtering the projection images to obtain a set of filtered first intermediate images. A set of second intermediate images are formed by filtering the projection images with a second filter. A three-dimensional reconstruction dataset is constructed from the filtered projection images filtered by way of the second filter, and forward projection is applied in the projection directions. Displacement information is determined for each projection direction by comparing the respective first intermediate image with the second intermediate image, and the geometric parameters are adjusted as a function of the displacement information.

12 Claims, 2 Drawing Sheets

(56) References Cited

U.S. PATENT DOCUMENTS

| | | |
|---|---|---|
| 2008/0056549 A1* | 3/2008 | Hamill et al. ............... 382/131 |
| 2013/0083986 A1* | 4/2013 | Zeng et al. ................. 382/131 |
| 2013/0177132 A1* | 7/2013 | Takahashi et al. ............ 378/4 |
| 2013/0223719 A1* | 8/2013 | Ohishi et al. ............... 382/132 |

OTHER PUBLICATIONS

Simbt et al. "Markerbasiertes Online Kalibrierverfahren für die CT-Rekonstruktion", Bildverarbeitung für die Medizin 2010 Algorithmen—Systeme—Anwendungen vol. 574, pp. 157-161 Aachen, Germany, Mar. 14-16, 2010.

Panetta et al., "Semi-automatic misalignment correction for a small animal micro-CT scanner with variable geometry", CT Meeting 2010, CNR Institute of Clinical, Physiology, p. 49-52; Pisa, Italy.

Hanis et al., "Projection-based mation compensation for gated coronary artery reconstruction from rotational x-ray angiograms"; IOP Publishing, p. 3807-3820; Phys. Med. Biol. 53 (2008)3807-3820; UK; 2008.

Kyriakou et al., "Simultaneous misalignment correction for approximate circular cone-beam computed tomography", IOP Publishing, Phys. Med. Biol. 53 (2008) 6267-6289; Oct. 29, 2008; Institute of Physics and Engineering in Medicine; UK; 2008.

Deserno et al., "BVM-2010 Bildverarbeitung fuer die Medizin 2010—Algorithmen—Systeme—Anwendungen"; Springer-Verlag, Informatik Aktuell, ISBN: 978-3-642-11967-5; Mar. 14-16, 2010; Aachen, Germany; 2010.

* cited by examiner

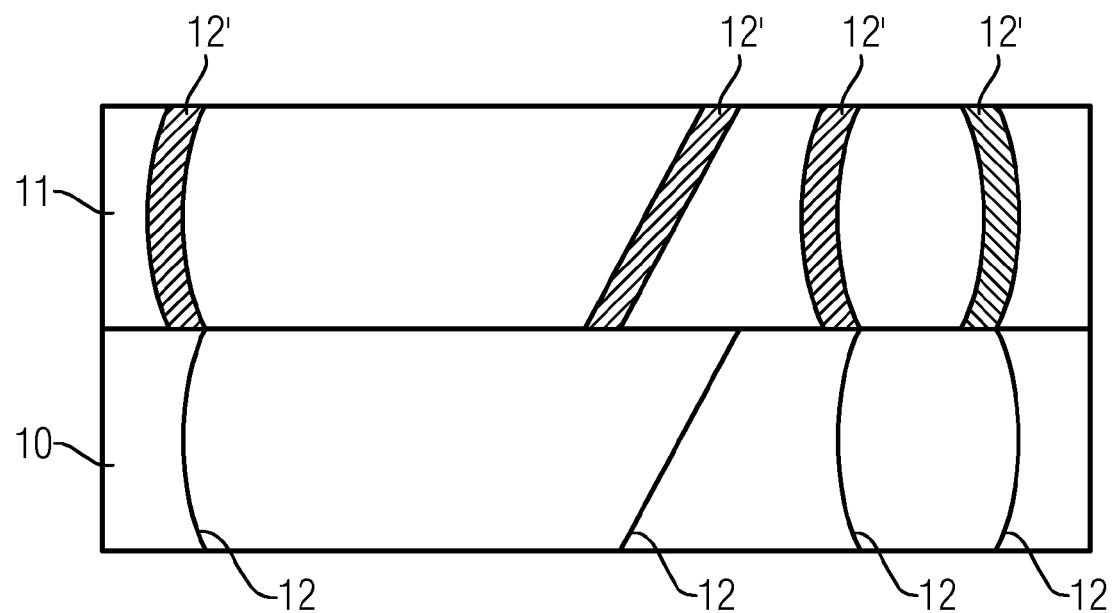

METHOD FOR REDUCING MOTION ARTIFACTS

CROSS-REFERENCE TO RELATED APPLICATION

This application claims the priority, under 35 U.S.C. §119, of German patent application DE 10 2012 204 019.6, filed Mar. 14, 2012; the prior application is herewith incorporated by reference in its entirety.

BACKGROUND OF THE INVENTION

Field of the Invention

The invention relates to a method for reducing artifacts resulting due to unrecorded, stochastically distributed movements of a radiation source and/or a radiation detector and/or of an object during the scanning of the object. The artifacts appear during the reconstruction of a three-dimensional image dataset from two-dimensional projection images acquired from different projection directions by way of an image acquisition arrangement that includes the radiation source and the radiation detector. Geometric parameters describing an acquisition geometry for each projection image are taken into account during the reconstruction.

The reconstruction of three-dimensional image datasets from two-dimensional projection images of an object acquired from different projection directions, in particular in medicine, is already widely known in the prior art. Such three-dimensional x-ray imaging has developed into an important technology in medical diagnostics and intervention in which the density distribution of the examination object is determined from a sequence of acquired two-dimensional projection images. Precise knowledge of the acquisition geometry of the acquired projection image series is extremely important for the reconstruction of a high-quality three-dimensional image dataset of the type. In order to describe the acquisition geometry use is made of geometric parameters, in most cases projection matrices, from which actual beam trajectories can be derived.

Errors in the geometry description, in other words in particular in the geometric parameters, lead in this case to undesirable artifacts, for example to image blurring or structural distortions. For this reason it is known in practice usually to perform a calibration scan using a special geometric object, for example a spiral phantom, from which the acquisition geometry of the calibration run can be determined with a high degree of accuracy. The geometric parameters determined in this way are deemed valid for subsequent image acquisitions during clinical operation.

However, this approach is problematic in the case of x-ray equipment in which there is insufficient mechanical reproducibility of the system movements, in particular the movements of the image acquisition arrangement. This problem occurs mainly with x-ray equipment which has been developed with the aim of achieving a high degree of freedom of movement and high mobility. An example of this are x-ray devices having a C-arm in which, in the context of the trademark DynaCT® three-dimensional image datasets can also be acquired and reconstructed from projection images.

Causes for errors of that kind in geometric parameters are for example unintended movements of the radiation source and/or radiation detector produced due to drive means or mechanical couplings. These movements, in most instances deflections to one side, take place in this case stochastically distributed around the base position, which means that the deviations are present stochastically distributed around 0. Motion artifacts resulting therefrom can be referred to for example as "jitter." Other causes of such artifacts may also be movements of the object itself which can be described only conditionally as stochastically distributed.

Methods have already been proposed in order to determine the non-reproducible movement components, in other words those which cannot be determined by way of a calibration run, so that the accuracy of the geometric parameters and consequently the 3D image quality can be increased. In most cases, however, these solution approaches for estimating the non-reproducible geometric parameters have disadvantages.

In an article by Simbt, Dennerlein and Böse enitled "Markerbasiertes Online Kalibrierverfahren für die CT-Rekonstruktion" ("*Marker-based online calibration methods for CT reconstruction*"), in: "Bildverarbeitung in der Medizin 2010" ("*Image Processing in Medicine* 2010"), Springer Verlag, ISBN 978-3-642-11967-5, the authors proposed to arrange markers, steel balls for example, on the object, in reality a patient, so that the geometric parameters, in reality the projection matrix for example, can be determined for each projection image. However, that approach is handicapped by disadvantages in the sense that not only must the markers be attached, but also markers must be chosen to be small in most cases, with the result that they are discernible only with difficulty in the projection images and consequently cannot yield the geometric parameters with sufficient precision. If larger markers are chosen, there exists the problem that the markers themselves can cause artifacts, metal artifacts for example. Furthermore the additional overhead required for setting the markers is disadvantageous.

In a further method it has been proposed in an article by Kyriakou, Lapp, Hillebrand, Ertel, and Kalender, entitled "Image-based Online Correction of Misalignment Artifacts in Cone-Beam CT", Medical Imaging 2009: Physics of Medical Imaging, Proceedings of the SPIE, Volume 7258, Orlando (Fla.), USA, February 2009, pages 72581V 1-10, to use image quality metrics in the three-dimensional reconstruction result and to apply an iterative optimization method in respect of said image quality metrics in order to obtain an improved description of the acquisition geometry, hence improved geometric parameters. With this approach it can be provided for example to assess the blurring in the three-dimensional image dataset at edges, in which case for example the entropy of a grayscale value histogram can be taken into account. This method is computationally intensive and has the disadvantage that the image quality metric contains no information about the direction in which an optimal adjustment would be possible.

Finally, in a paper presented at the CT Meeting 2010 by Panetta, Belcari, Del Guerra and Salvadori of the CNR Institute of Clinical Physiology in Pisa, Italy, entitled "Semiautomatic misalignment correction for a small animal microCT scanner with variable geometry", the authors proposed to use data redundancies for rectifying geometric deviations. However, this has the disadvantage that such redundancies are of course specifically to be kept to a minimum in most cases. Redundant data is therefore not present for all beam paths, while acquisition methods are also known in which precisely this is to be avoided, for example within the context of tomography.

SUMMARY OF THE INVENTION

It is accordingly an object of the invention to provide a method for reducing motion artifacts which overcomes the above-mentioned disadvantages of the heretofore-known devices and methods of this general type and which provides for an improved method, that is, in particular, more precisely targeted, for determining more accurate geometric parameters and consequently for reducing artifacts, in particular jitter artifacts that are due to incorrect geometric parameters.

With the foregoing and other objects in view there is provided, in accordance with the invention, a method of reducing artifacts resulting from unrecorded, stochastically distributed movements of a radiation source and/or a radiation detector and/or an object during a scanning of the object, wherein the artifacts occur when a three-dimensional image dataset is reconstructed from two-dimensional projection images acquired from mutually different projection directions by way of an image acquisition arrangement having the radiation source and the radiation detector, and wherein geometric parameters describing an acquisition geometry for each projection image are taken into account during the reconstruction of the three-dimensional image dataset. The method comprises performing the following correction steps:

subjecting the projection images to a first filter for determining a set of filtered first intermediate images;

subjecting the projection images to a second filter combining a ramp filter and the first filter, reconstructing a three-dimensional reconstruction dataset from the projection images after filtering by the second filter, and applying a forward projection in the projection directions and determining a set of second intermediate images;

comparing a respective first intermediate image with a second intermediate image, for determining displacement information for each projection direction; and adjusting the geometric parameters in dependence on the displacement information.

In other words, the objects of the invention are achieved with the following method steps:

determining a set of filtered first intermediate images by applying a first filter, in particular a ramp filter, to the projection images;

determining a set of second intermediate images by filtering the projection images by means of a second filter, in particular a second derivative, combining a ramp filter and the first filter, reconstructing a three-dimensional reconstruction dataset from the projection images filtered by means of the second filter, and applying forward projection in the projection directions;

determining displacement information for each projection direction by comparing the respective first intermediate image with the second intermediate image; and adjusting the geometric parameters as a function of the displacement information.

It is a fundamental concept of the present invention, therefore, to improve geometric parameters by determining a specific intermediate image in the projection space twice, once directly by filtering an acquired x-ray projection image, and once indirectly, by applying filter, forward and back projections. It should be noted here that a back projection and a forward projection performed in succession have the effect of an inverse ramp filter, so the filtering for determining the second intermediate image must take this into account. Accordingly, a filter combining the first filter with a ramp filter must be used as the second filter in order to obtain directly comparable intermediate images. If the conventional global ramp filter for filtering the projection images is used as the first filter, then the filter of choice as the second filter is the local second derivative. In reality, therefore, the first intermediate image can be generated by row-by-row ramp filtering of the x-ray projection image, the second intermediate image being generated by calculating a row-by-row second derivative, followed by a 3D back projection and subsequent 3D forward projection. Given perfectly known geometric information, this second sequence of operations likewise generates a projection image convoluted by means of the one-dimensional ramp filter, such that the indirect calculation describes an alternative, novel way for generating filtered projection data.

The consideration here is generally that the directly determined first intermediate image is of good quality, since a projection image always reveals a consistent state of the scanned object. In contrast, the second intermediate image, which has been determined indirectly, is influenced by potentially inaccurate geometric parameters and consequently is generally, in particular therefore when a movement is present, of deviating quality by comparison with the first intermediate image. These deviations between the first intermediate image and the second intermediate image are now used as a criterion for quantifying geometric inaccuracies, the deviation being minimal in the case of a perfectly known acquisition geometry.

Given inaccurate geometric parameters, two deviations between the first intermediate image and the second intermediate image now occur in the described case of movements stochastically distributed around a base position. The first deviation relates to the sharpness of the image. The second intermediate image is less sharp than the first intermediate image, which is a direct consequence of all the geometric deviations during the acquisition process. As the second deviation, however, the first intermediate image is displaced or shifted with respect to the second intermediate image, essentially in a direction in the plane of the acquisition trajectory, which is a consequence of the deviations of the currently studied projection image. In the case of movements stochastically distributed around a base position, however, said second deviation now indicates in which direction it is necessary to "shift back", which means in which direction the actual movement of said projection image took place, so that displacement information determined by comparing the first intermediate image and the second intermediate image gives a direct indication for targeted correction of the geometric parameters, for example in the form of a projection matrix.

As has already been explained, most of the actually relevant movements clearly leading to artifacts are movements such as take place in the plane of the acquisition trajectory, in other words in an orbit in the plane of the circle. The method according to the invention can now be configured for the targeted correction thereof, so that it can also be provided for example that only some of the geometric parameters are corrected, for example those describing translations of the detector.

In principle it is beneficially conceivable within the scope of the present invention to adjust only geometric parameters of the radiation detector. This enables the problem to be limited to a subset of the totality of geometric parameters. If projection matrices are used, for example, these can be decomposed by means of geometric parameters of the radiation source, in other words in particular the position of the radiation source, and geometric parameters of the detector. If the latter are considered, the correction can consequently be regarded as a virtual displacement of the detector. In particular, therefore, it can also be provided in a further embodiment of the invention that geometric parameters describing the movement of the radiation detector in the radiation detector plane are adjusted.

It should be pointed out in this case that within the scope of the present invention it is, however, also conceivable to take into account displacement information in respect of a rotation that has occurred or the like, although this seldom occurs in practice and, as has been shown, has less influence on the reconstruction result.

Generally it can therefore be said that a rigid registration between the respective intermediate images is carried out in order to determine the displacement information. This means that in principle any type of 2D-2D registration can be employed in order to determine the displacement of the acquired intermediate image with respect to the second intermediate image for each projection direction.

In a particularly advantageous embodiment of the method according to the invention it can be provided that the correction steps are iteratively repeated until a quality value describing the deviation of the geometric parameters from the real geometry falls below a limit value or becomes minimal. The geometry information, in reality the geometric parameters, can therefore be further improved iteratively in multiple passes through the correction steps within an iteration cycle, such that ultimately an incremental approximation to a sufficiently accurate geometric parameter set is made. In this case a quality value is considered which is geared in a targeted manner to the image effects and artifacts generated due to incorrect geometric parameters.

It is particularly preferred in this case if the quality value is a value describing the sharpness of the second intermediate image, in particular in comparison with the first intermediate image. As has already been described hereinabove, two different deviation effects occur in fact between the first and the second intermediate image, namely on the one hand the displacement, which contains a pointer to the correction of the geometric parameters that needs to be performed, but on the other hand also the blurring, as is also caused in three-dimensional reconstruction datasets due to inaccurate geometric parameters. Information about the accuracy of the geometric parameters can therefore be derived through comparison of the sharpness of the two images, such that said information accordingly lends itself as an image quality metric on the basis of which the improvement in the iteration process can be considered. The quality value can then be accordingly optimized, in particular in the sense of a minimalization, or an iterative process can be performed until a specific limit value is undershot (in which case the condition can of course also be provided in addition that the process will be aborted automatically after a specific number of iteration steps).

Other quality values are also conceivable, though these are less preferred according to the invention. For example, it is also possible to consider the entropy of the grayscale value histogram in the reconstruction dataset, and the like.

In a particularly beneficial development of the present invention it can be provided that every second intermediate image in each case is assumed as the assigned first intermediate image convoluted with a two-dimensional, non-rotated Gaussian core and a displacement between the intermediate images and the standard deviations are determined as parameters of the Gaussian core, the displacements being used as displacement information and the quality value being derived from the standard deviations. The second intermediate image can therefore be described, in particular with regard to the displacement and the blurring, as a convolution of the first intermediate image with a two-dimensional, non-rotated Gaussian core which, as is known, can have four free parameters, in particular a Cartesian displacement with respect to the position (which can be used as displacement information) and standard deviations for each direction, which represent a metric for the blurring. In this case, therefore, both deviations can be described by means of different parameters within the scope of a single transformation, in this case a convolution, such that a particularly compact embodiment variant of the inventive method is produced which can be realized effectively. The standard deviations can therefore be incorporated into the quality value, while the positional displacements are applied as displacement information. Let it be noted that if rotational movements are also to be covered, a two-dimensional Gaussian core comprising corresponding parameters can also be used.

In a further advantageous embodiment of the present invention it can be provided that a plurality of iteration processes are performed for different levels of detail increasing in the course of the correction, in that before the correction steps are performed a lowpass filter is applied to the projection images for all iteration processes preceding the most recent iteration process, the lowpass filtering being reduced as the number of iteration processes increases. In this manner a multiresolution approach is ultimately provided, wherein additional lowpass filtering is applied during the preprocessing in the first iteration processes, which lowpass filtering is reduced successively, i.e. from iteration process to iteration process. In this way the greater deviations can be determined first in an extremely robust manner before corrections take place at the detail level.

It should furthermore be noted at this juncture that such an incremental increase in the depth of detail can also be provided within a single iteration process. In this connection it is therefore proposed, for a predetermined number of first passes through the correction steps, to treat the projection images initially with a lowpass filter, the lowpass filtering of which reduces as the number of passes through the correction steps increases. Since initially only coarser deviations are corrected in this way robustly at a coarser resolution, it is not however to be assumed that an abort criterion established by way of the quality value is already satisfied, such that in the end progress to smaller details and consequently smaller deviations can be made incrementally within a single iteration process.

It should be pointed out here that the method according to the invention can be realized for example fully automatically on a computing device, in particular a computing unit of an x-ray device. For example, an image processor of an x-ray device can immediately be supplemented by such a functionality for correcting movements of the stochastically distributed type described. The method according to the invention is suitable in this case in particular for x-ray devices having a C-arm, in which such movement patterns which can lead to artifacts in reconstructed three-dimensional image datasets can often occur on account of the mechanism of the image acquisition arrangement permitting many degrees of freedom.

It should however also be pointed out generally at this juncture that the extremely robust and computationally effective method according to the invention is especially suited to cases in which contrasts, for example edges, are to be clearly resolved and high-precision structures are desired. For example, the method according to the invention can advantageously be employed in bone imaging and the like.

Other features which are considered as characteristic for the invention are set forth in the appended claims.

Although the invention is illustrated and described herein as embodied in a method for reducing motion artifacts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 shows a schematic diagram for comparing the first intermediate image with the second intermediate image.

DETAILED DESCRIPTION OF THE INVENTION

Figure 1:
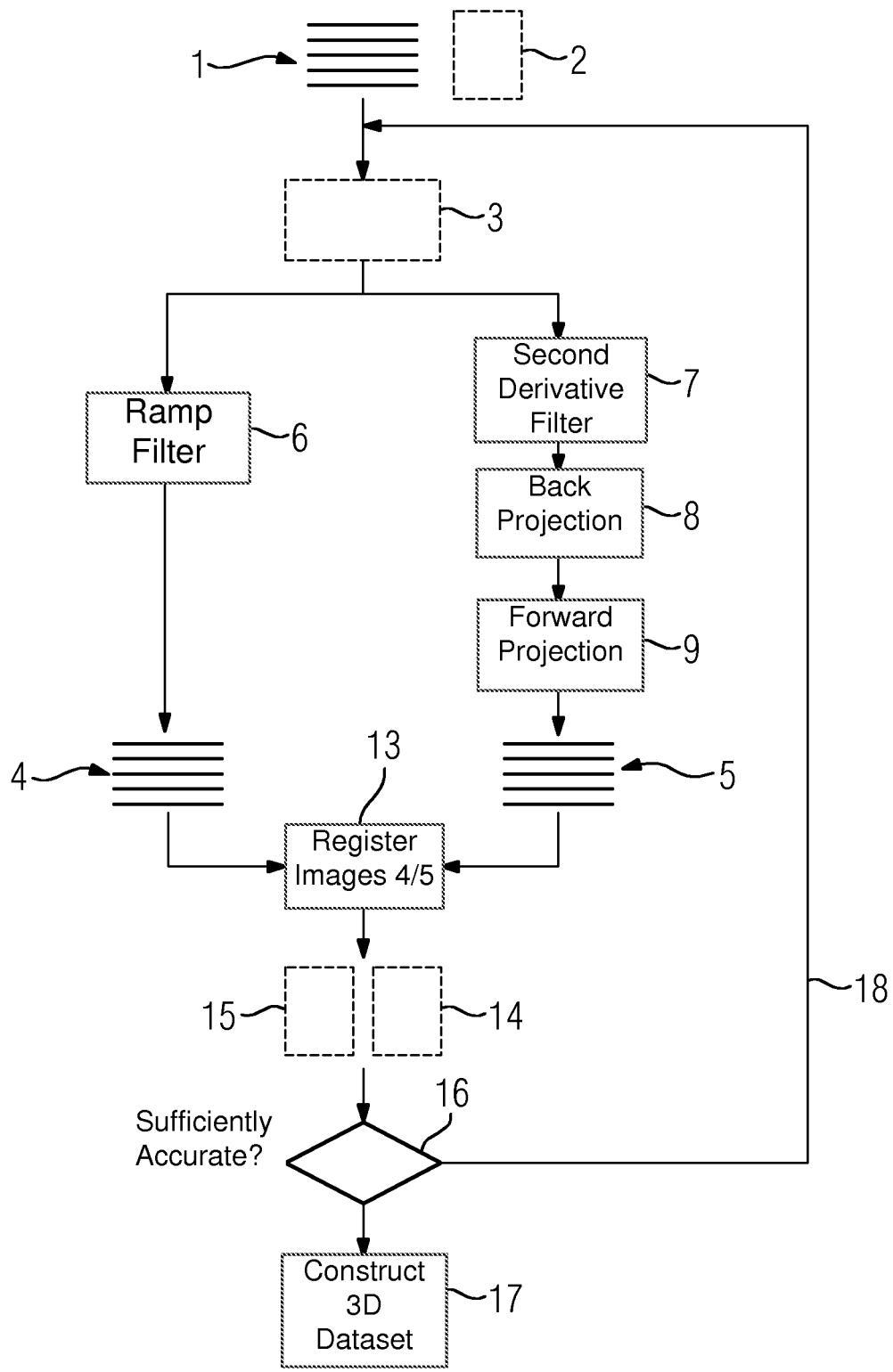
FIG. 1 shows a flowchart illustrating the method according to the invention.

The exemplary embodiment of the method according to the invention presented hereinbelow relates to a C-arm x-ray device in which a radiation source and a radiation detector are arranged opposite each other on a C-arm to form an image acquisition arrangement. The image acquisition arrangement can now be moved around an object that is to be scanned, in particular a patient, while projection images from which a three-dimensional image dataset is to be reconstructed are acquired from different projection directions. While this happens, stochastic movements of the radiation source and/or the radiation detector about their base position can occur during the acquisition process for the projection images. Initially, however, these movements are unknown in the geometric parameters, which can for example include a projection matrix for each projection direction. This can result in artifacts being generated, in particular jitter artifacts. In order to counteract these, a calculation device of the x-ray device is now embodied for the purpose of performing the method according to the invention, which corrects the geometric parameters and consequently provides a better description of the geometry that actually applies during the acquisition of the projection images.

In reality the artifacts responsible for the inaccuracy of the geometric parameters can be produced for example when the radiation detector is moved along an acquisition trajectory, for example a circular path, in order to acquire the projection images, but the trigger times and the detector speed are not synchronized, with the result that the radiation detector must be momentarily halted and proceeds to vibrate in the plane of the circular path while the acquisition is then actuated. Other causes are also conceivable, however.

Referring now to the figures of the drawing in detail and first, particularly, to FIG. 1 thereof, there is shown a flowchart of the method according to the invention. Taken as the starting point therein are the acquired projection images 1, to which specific geometric parameters 2, in this case the basically known projection matrices, are assigned. Before the actual correction steps of the method according to the invention take place, an optional preprocessing stage can be provided in a step 3, for example lowpass filtering dependent on the progress of the iteration, which will be dealt with in closer detail hereinbelow.

The idea is now to perform a filter operation in two different ways in order to obtain a first set of first intermediate images 4 and a second set of second intermediate images 5. A first intermediate image 4 and a second intermediate image 5 then exist for each of the projection images 1.

In order to arrive at the first intermediate images, each projection image 1 is treated in a step 6 with a first filter, in this case a ramp filter. This means that in the present case an actual row-by-row ramp filtering takes place, as is basically known in the prior art, with the result that the first intermediate images 4 are obtained.

In order to obtain the second intermediate images 5, a filtering operation is performed first in a step 7 using a second filter, in this case a row-by-row second derivative. In a step 8, back projection of the projection images 1 filtered by means of the second filter is then performed in order to determine a three-dimensional reconstruction dataset from which, in a step 9, the second intermediate images 5 are obtained by forward projection in the projection directions of the projection images 1. The back projection and forward projection performed successively in steps 8 and 9 are equivalent to an inverse ramp filter, so given exactly correct geometric parameters 2 (and without taking other effects into account) exactly identical first and second intermediate images 4, 5 would be expected, which means that the filter operations in step 6 or steps 7-9 are to be evaluated as being equivalent. The filtering in steps 7-9 may be described as indirect.

If the geometric parameters 2 for a projection image 1 of one projection direction are incorrect, this however results in deviations between the corresponding first intermediate image 4 and the second intermediate image 5 likewise assigned to the projection direction. Let this be explained in more detail on the basis of the schematic diagram shown in FIG. 2. Whereas a detail from a first intermediate image 4 for one projection direction is indicated schematically in the lower section 10 of FIG. 2, the second projection image 5 corresponding to the same projection direction is indicated in a second section 11. If the geometric parameters 2 are not consistent with reality, this clearly leads to structures 12 that are naturally imaged sharply in the first intermediate image 4 appearing again in the second intermediate image 5 as blurred, displaced structures 12'.

There are therefore two deviation effects present, specifically an occurrent lack of definition on the one hand, and an occurrent displacement on the other. Because the displacement indicates how the geometric parameters 2 are to be corrected, hence describes an actual deviation of the geometric parameters 2 from the real geometric parameters, displacement information determined from the displacement can therefore be used for correcting the geometric parameters 2, with the radiation detector finally being virtually "shifted" in order to correct. The correction therefore relates to geometric parameters 2 of the detector which are contained, for example, in the frequently used projection matrices.

The lack of definition of the structures 12 is suitable in particular for describing the general quality of the geometric parameters 2 so that this can be evaluated with regard to a quality value.

In order to determine the displacement information and the quality value from the respective first and second projection images, it is provided according to step 13 (FIG. 1) to register the first and second intermediate images 4, 5 corresponding to the same projection directions with one another, accordingly to determine a mapping between the first intermediate image 4 and the second intermediate image 5. In the present case it is estimated therefor that the second intermediate image 5 is produced as a result of a convolution of the first intermediate image 4 with a two-dimensional, non-rotated Gaussian core which has four parameters, namely two standard deviations and two parameters describing a translational displacement. If these parameters are determined, the quality value 14, which ultimately is to become as small as possible, can be determined from the standard deviations (beneficially for all projection directions). The displacement information 15 can be derived from the displacement described by the further parameters. The displacement information 15 is now used for correcting the geometric parameters 2.

In a step 16 a check is made to determine whether the geometric parameters 2 are already sufficiently accurate, whereby the quality value 14 can for example be compared against a limit value, though it is also possible to continue the iteration process until a minimum of the quality value 14 is found. A further conceivable abort condition is a change in the quality value 14 undershooting a limit value. It can also be provided as an additional abort condition that a maximum number of iterations is provided.

If the abort condition or an abort condition is fulfilled, the correction method is terminated in a step 17, in particular in that the definitive reconstruction of a three-dimensional image dataset from the projection images 1 is now performed using the corrected geometric parameters 2.

Otherwise, a further pass through the correction steps is required, as represented by the arrow 18. A continuous improvement of the geometric parameters 2 therefore takes place iteratively.

The exemplary embodiment of the method according to the invention described in the present instance can optionally be improved even further by performing lowpass filtering in the preprocessing step 3 at least for a predetermined number of the first passes through the correction steps (iteration steps). As the number of passes increases, the lowpass filtering in this case becomes smaller and smaller, until eventually it ceases to apply. This ensures that initially the consideration is finally performed only at a coarse resolution, such that the displacement information 15 can be robustly determined and applied. In this multi-resolution approach, progress is then made incrementally to smaller details until eventually the desired correction is achieved.

It should however be noted that it is also conceivable to consider a plurality of iteration processes to be performed as a whole, with a lowpass filter being attenuated incrementally between the individual iteration processes.

Although the invention has been illustrated and described in detail on the basis of the preferred exemplary embodiment, the invention is not limited by the disclosed examples and other variations can be derived herefrom by the person skilled in the art without departing from the scope of protection of the invention.

The invention claimed is:

1. A method of reducing artifacts resulting from unrecorded, stochastically distributed movements of a radiation source and/or a radiation detector and/or an object during a scanning of the object, wherein the artifacts occur when a three-dimensional image dataset is reconstructed from two-dimensional projection images acquired from mutually different projection directions by way of an image acquisition arrangement having the radiation source and the radiation detector, and wherein geometric parameters describing an acquisition geometry for each projection image are taken into account during the reconstruction of the three-dimensional image dataset, the method which comprises performing the following correction steps:

subjecting the projection images to a first filter for determining a set of filtered first intermediate images;

subjecting the projection images to a second filter combining a ramp filter and the first filter, reconstructing a three-dimensional reconstruction dataset from the projection images after filtering by the second filter, and applying a forward projection in the projection directions and determining a set of second intermediate images;

comparing a respective first intermediate image with a second intermediate image, for determining displacement information for each projection direction; and adjusting the geometric parameters in dependence on the displacement information.

2. The method according to claim 1, wherein the first filter is a ramp filter.

3. The method according to claim 1, wherein the second filter is a second derivative.

4. The method according to claim 1, which comprises determining the displacement information based on a rigid registration between the respective first and second intermediate images.

5. The method according to claim 1, which comprises repeating the correction steps iteratively until a quality value describing the deviation of the geometric parameters from the real geometry falls below a limit value.

6. The method according to claim 1, which comprises repeating the correction steps iteratively until a quality value describing the deviation of the geometric parameters from the real geometry reaching a minimum.

7. The method according to claim 5, wherein the quality value is a value describing a sharpness of the second intermediate image.

8. The method according to claim 7, wherein the quality value is a value describing a sharpness of the second intermediate image in comparison with the first intermediate image.

9. The method according to claim 5, which comprises assuming every other second intermediate image as a corresponding first intermediate image convoluted with a two-dimensional Gaussian core and determining a displacement between the intermediate images and the standard deviations as parameters of the Gaussian core, and using the displacements as displacement information and deriving the quality value from the standard deviations.

10. The method according to claim 5, which comprises performing a plurality of iteration processes for mutually different levels of detail increasing in a course of the correction, in that before the correction steps are performed, applying a lowpass filter to the projection images for all iteration processes preceding a most recent iteration process, and reducing a lowpass filtering as a number of iteration processes increases.

11. The method according to claim 1, which comprises adjusting only geometric parameters of the radiation detector.

12. The method according to claim 11, which comprises adjusting only geometric parameters describing a movement of the radiation detector in a radiation detector plane.

* * * * *